United States Patent [19]
Rahn et al.

[11] Patent Number: 4,884,283
[45] Date of Patent: Nov. 28, 1989

[54] RING LASER GYROSCOPE MIRROR ORIENTATION SYSTEM AND METHOD

[75] Inventors: John Rahn, Canoga Park; Thomas J. Hutchings, West Hills, both of Calif.

[73] Assignee: Litton Systems, Inc., Beverly Hills, Calif.

[21] Appl. No.: 287,131

[22] Filed: Dec. 20, 1988

[51] Int. Cl.[4] .............................................. H01S 3/08
[52] U.S. Cl. ................................... 372/107; 372/94; 356/350
[58] Field of Search ................... 372/107, 94; 356/350

[56] References Cited

U.S. PATENT DOCUMENTS

| | | |
|---|---|---|
| 4,115,004 | 9/1978 | Hutchings . |
| 4,152,071 | 5/1979 | Podgorski . |
| 4,281,930 | 8/1981 | Hutchings . |
| 4,442,762 | 12/1983 | Hutchings . |
| 4,522,496 | 6/1985 | Sanders . |
| 4,641,970 | 2/1987 | Gustafson . |
| 4,657,392 | 4/1987 | Egli . |
| 4,695,160 | 9/1987 | Egli . |
| 4,702,600 | 10/1987 | Handrich et al. .................... 356/350 |
| 4,831,632 | 5/1989 | Simms ................................ 372/107 |

OTHER PUBLICATIONS

Elson, *Scattering from Optical Surfaces*, vol. VIII, Chapt. 7, "Applied Optics & Optical Engineering", pp. 191–244, 1979 Academic Press.
Erf, "Applications of Laser Speckle to Measurement", *Laser Applications*, vol. 4, pp. 1–69, Academic Press, 1980.
Chiang, "Laws of Laser Speckle Movement in Space" *Optical Engineering*, vol. 5 (25), pp. 667–670 (May 1986).
Stetson, "A Review of Speckle Photography & Interferometry", *Optical Engineering*, vol. 14, (5), Sep. Oct. 1975.
Anderson, "Alignment of Resonant Optical Cavities", *Applied Optics*, vol. 23, Sep. 1984.

*Primary Examiner*—Leon Scott, Jr.
*Attorney, Agent, or Firm*—L. David Rish

[57] ABSTRACT

A method and system of ring laser gyroscope mirror orientation is disclosed which provides minimal backscatter within the closed optical pathway as a result of analysis and manipulation of the speckle pattern associated with each of the mirrors defining the optical pathway.

9 Claims, 3 Drawing Sheets

RING LASER GYROSCOPE MIRROR ORIENTATION SYSTEM AND METHOD

BACKGROUND OF THE INVENTION

1. Field of the Invention

This invention relates to a system and method for orientation of the mirrors located along the closed optical path of a ring laser gyroscope. More particularly, this invention is directed to a mirror orientation system and method for a ring laser gyroscope in which a resultant speckle pattern from each mirror is formed by directing a coherent light beam into the optical path, and reflecting the light off the surface of each mirror in the path. The particular speckle pattern associated with each mirror surface is then isolated. An optimum mirror beam location along the reflecting surface of each mirror with respect to the laser beam and an optimum rotational angle of the mirror about its normal is determined through photo-detection methods such that the speckle pattern is minimized. The mirrors are then secured to the ring laser gyroscope in the position along the optical path, providing superior mirror positioning with reduced total resonant retroscatter.

2. Description of the Related Art

Ring Laser Gyroscopes form a modern alternative class of optical rotational sensors, providing inertial guidance information by other than mechanical gyroscopic systems. Ring laser gyroscopes are designed to measure the phase shift induced by rotation between at least two oppositely directed light beams traversing a closed optical path which encloses an area. This phase shift, which arises during rotation of the closed path, is used to measure the amount of gyroscopic rotation. The rotation-induced phase shift is known as the Sagnac effect, and is due to the fact that during gyroscope rotation, the distance traversed by a clockwise light beam may be different than the distance traversed by a counter-clockwise light beam over the same optical path, providing the "effective plane" of the path is not parallel to the axis of rotation.

If ring laser gyroscopes were ideal devices, the rate at which light beam wave phase shifts (measured by detecting fringes) at a detector would be directly proportional to the rate of rotation. Ideally, if the ring optical path of the gyroscope were not rotating, the light beam wave fringes would be static and fixed with respect to the frame to which the mirrors are attached.

Practical ring laser gyroscopes are subject to bias and frequency locking problems which can cause errors in the phase shift information as detected "rotation", when the gyroscope is actually stationary, or vice versa. Practical ring laser gyroscopes are active laser devices, where a gas laser occupies a portion of the closed optical path. Gas flow in a preferred direction, such as cathode to anode in a D.C. discharge region, gives rise to bias. One way to correct this bias is by providing two anodes, symmetrically positioned about the optical path, to offset flow effects.

Frequency locking, known in the art as "lock-in", is a problem that is prominent at low rotation rates. Practical closed optical paths for ring laser gyroscopes are defined by a plurality of spaced apart mirrors. Minute imperfections in the reflecting surfaces of the mirrors gives rise to the "lock-in" phenomenon. The imperfections can cause a small fraction of incident light to backscatter. Coupling between the counter-directed light incident and the backscattered light can give rise to the standing wave characteristic of "lock-in".

Heretofore, the avoidance or reduction of lock-in due to backscatter has been addressed by mechanical or optical biasing schemes, directed to an operating gyroscope during gyroscope operation. Examples of these schemes include: a body dithered ring laser gyroscope, as in U.S. Pat. No. 4,115,004 to Hutchings (issued to the assignee of this application); mirror servoing, as in U.S. Pat. Nos. 4,152,071 to Podgorski and 4,422,762 to Hutchings et. al. (762 issued to the assignee of this application); mirror dithering, as in U.S. Pat. No. 4,281,930 to Hutchings (issued to the assignee of this application); and, optical mode locking reduction schemes, as in U.S. Pat. No. 4,522,496 to Sanders (issued to the assignee of this application). More recently, U.S. Pat. Nos. 4,641,970 to Gustafson et. al., 4,657,392 to Egli, and 4,695,160 to Egli, all are directed to lock-in correction, discriminating, or error cancelling systems during gyroscopic operation. All the foregoing systems operate from a premise that certain levels of backscatter will occur and, therefore, the only way to address errors that arise as a result of lock-in is during laser gyroscope operation.

The lock-in of the foregoing gyros can be a major error source. The only attempt made at the present time to control the scatter that causes lock-in is to use very low scatter mirrors and position them so no obvious macroscopic defects are impinged upon by the laser beam. These designs hence attempt to reduce the level of backscatter, by means of translation of the mirrors with respect to the laser beam, at the time of gyroscope manufacture.

It has been known, heretofore, that scattering from highly polished optical surfaces are due to microirregularities of only a few nanometers or less. See, J. M. Elson, et. al., *Scattering from Optical Surfaces*, in Vol. VIII, Chapter 7, APPLIED OPTICS AND OPTICAL ENGINEERING, P. 191-244 (1979, Academic Press, Inc.), for a complete discussion of this type of scatter. This article notes that both scalar and vector theory may be applied to the analysis of scattering where the surface roughness is less than or near light wave length. Such scattering is not easily described by geometric optics.

One type of scatter phenomenon that arises in the presence of coherent light is laser speckle. Speckle may be thought of as a self-interference phenomenon between light waves coming from different elementary areas of a rough surface having height variations on the order of a wavelength of light. See, Robert K. Erf, APPLICATION OF LASER SPECKLE TO MEASUREMENT, in Laser Applications, Volume 4, pp. 1-69 (Academic Press, 1980). In particular, laser photography has been used to measure the out-of-plane rotation or tilt of a rough surface. Also, studies have been made to investigate the laws which govern spatial movement of laser speckles; F. P. Chiang, et. al., *Laws of Laser Speckle Movement in Space*, OPTICAL ENGINEERING, Vol 5 (25), pp. 667-670 (May 1986).

Heretofore, it was known that when laser light is incident on a finely irregular surface, the fine structure of the surface (which may even be small with respect to the wavelength of light) imparts a random phase modulation to the reflected light. (See, Karl A. Stetson, *A Review of Speckle Photography and Interferometry*, in OPTICAL ENGINEERING, VOL. 14 (5), September, October, 1975).

As light propagates away from this rough surface, the speckle effect may be observed in an image plane removed from the surface, using a lens. This speckle field at any point in space may be thought of as the sum of components arriving from a variety of directions. The amplitude of field components may be close to one another, but their relative phase, although static, will be random. These properties of the speckle pattern of light reflected from a rough surface were known as a means for measuring in-plane deformation. However, none of the speckle pattern research has heretofore been applied to ring laser gyroscope technology.

A method for alignment to minimize losses, optimize mode structure and hence maximize the desired resonance of the laser device is assumed to be used; e.g., "Alignment of Resonant Optical Cavities," by Dana Z. Anderson, *Applied Optics*, Vol. 23, (Sept. 1, 1984). This commonly consists of tangential translation of the mirrors for maximized output power. This can be done passively (on an optical resonance) or actively as a laser.

SUMMARY OF THE INVENTION

This invention is directed to a system which controls and reduces overall backscatter during the manufacturing of a ring laser gyroscope; so that, during operation of the gyroscope backscatter is substantially minimized before body or mirror dither is applied to the gyroscope. Backscatter between left and right circularly polarized light in a multimode multioscillator laser gyroscope is also substantially reduced.

In this patent each mirror's orientation about its own normal is optimized. This orientation is to be distinguished from the usual orientation of the mirrors about their binomial and tangential which is used to align the beams in the resonator to minimize loss at the aperture.

This invention is directed to a system and method of mirror alignment and mirror orientation during manufacture of a ring laser gyroscope which includes a speckle error analysis and an accompanying reduction for each mirror of the gyroscope during alignment, so that when fully assembled, the mirrors are aligned such that the laser beam reflects off each mirror surface at a point on the surface where speckle error in the backscattered direction is minimized.

In this manner, optimum mirror orientation is achieved which minimizes the backscatter speckle intensity error introduced to the optical path by each mirror surface. In a two mode ring laser gyroscope, such speckle error reduction results in a reduction of error due to random walk and the scale factor. In a four mode gyroscope, scale factor error and bias error are reduced.

Disclosed herein is a ring laser gyroscope defining a closed optical path formed by an internal cavity connecting a plurality of reflecting mirrors. The mirrors are oriented according to a method which includes the steps of:

rotationally oscillating about their normals, each of the mirrors positioned along the optical path, while each of said rotating mirrors is positioned back from the ring laser gyroscope frame, along an axis of rotation normal to the mirror mounting surface;

measuring a resonant back-scattered output light beam emitted from the closed optical path to determine the speckle pattern intensity from the beam at a reflection point on the reflecting surface of the rotating mirror;

positioning the rotating mirror securely onto a corner of the frame when the speckle pattern from the mirror has reached a minimum optical intensity;

repeating the three previous steps for each remaining mirror one at a time until each mirror along the optical path is secured to the frame at a reflecting point such that the overall resonant cavity finesse is optimized; and, the total resonant backscatter is minimized with respect to the rotational angle, about their normals, of all 4 mirrors.

Additionally, a mirror under test may be translated along an axis normal to its surface, and be again reciprocally rotated in order to confirm that a minimum optical intensity measured heretofore is accurate.

In this manner, proper rotational orientation of each of the mirrors along the closed pathway is achieved. For best results, a coherent light beam source of a frequency similar to that of the laser gyroscope is used. This may be achieved by phase-locking said source to a resonant frequency of said gyroscope resonant cavity. The mirrors should be reciprocally rotated through a small angle, and each mirror should also be translated back towards the frame after an optimum position for securing the mirror is found.

The invention is also directed to a system for orientation of each of a plurality of mirrors of a ring laser gyroscope. The system has a source laser providing an external coherent light beam providing reflected light off the mirror surfaces producing a resultant speckle which is a function of the combined backscatter of light of the surfaces of the mirrors. Micromanipulator devices for fine movements of one of the mirrors is affixed to one of them providing a micro-translation of the mirror along an axis normal to its surface and oscillator movement of one of the mirrors about its surface and oscillator movement of one of the mirrors about its own axis when the mirror is withdrawn off the frame of the gyroscope. A detection device is used to detect speckle pattern associated with the mirror under fine movement by the micromanipulator device. Additionally, synchronous detection and feedback means may be used to adjust the micromanipulator device and mirror to aid in selecting an optimum surface location. Ring laser gyroscopes are manufactured wherein at least one mirror has been oriented to a speckle reduced position for more optimum gyroscope performance. In this manner, each mirror of the ring laser gyroscope may be positioned along the closed optical path at an optimum location.

These and other embodiments and advantages of the invention will become apparent with reference to the Brief Description of the Drawings and Detailed Description of the Preferred Embodiments as set forth hereinafter.

There are six degrees of freedom with which one may move flat mirrors in order to minimize their total retroscatter. Three of these are translation and three are rotation. Opposite translation of 2 mirrors along their normals is employed in Podgarski's U.S. Pat. No. 4,152,071 in real time. Equivalently, one can use fractional wavelength motion of the mirror surface in the plane of incidence to minimize total initial retroscatter but it is difficult to convert this to real time and the improvement disappears when the laser frame expands thermally. Movement perpendicular to the plane of incidence requires distances of order of 1 mm to see significant changes in retroscatter since this motion does not change the relative phase of scatter between the successive mirrors and improvement therefore depends on laser beam size. This covers the 3 translational degrees of freedom. There remain 3 orthogonal rotation axes. The rotation axes are the normal to the mirror, the binormal or perpendicular to the plane of incidence, and the tangential or parallel to the plane of incidence. Mirror rotation about the binormal or tangential causes laser misalignment and therefore increased aperture losses with undesirable performance degradation. We are therefore left with the 6th degree of freedom, rotation about the mirror normal, and that is what is used in this invention.

When a mirror with a beam of light impinging on it is rotated about the normal that passes through the beam center, we find that the interference pattern (speckle) created by the anomalies on the mirror rotates about the beam that is reflected specularly from the mirror. The speckle pattern is made up of light and dark spots which have subtend angles of order $\lambda/2w$ where w is the incident beam radius and $\lambda$ is the wavelength of the light. At 28 degrees incidence a mirror normal rotation of 0.001 radian causes, on the average, a bright speckle in the backward direction to be replaced with a dark or null speckle. Thus we adjust the mirror normal rotation angles in sub-milliradian increments to cause the retro-directed speckle spots of each to be dark or at least a good minimum.

DETAILED DESCRIPTION OF THE PREFERRED EMBODIMENT

Figure 1:
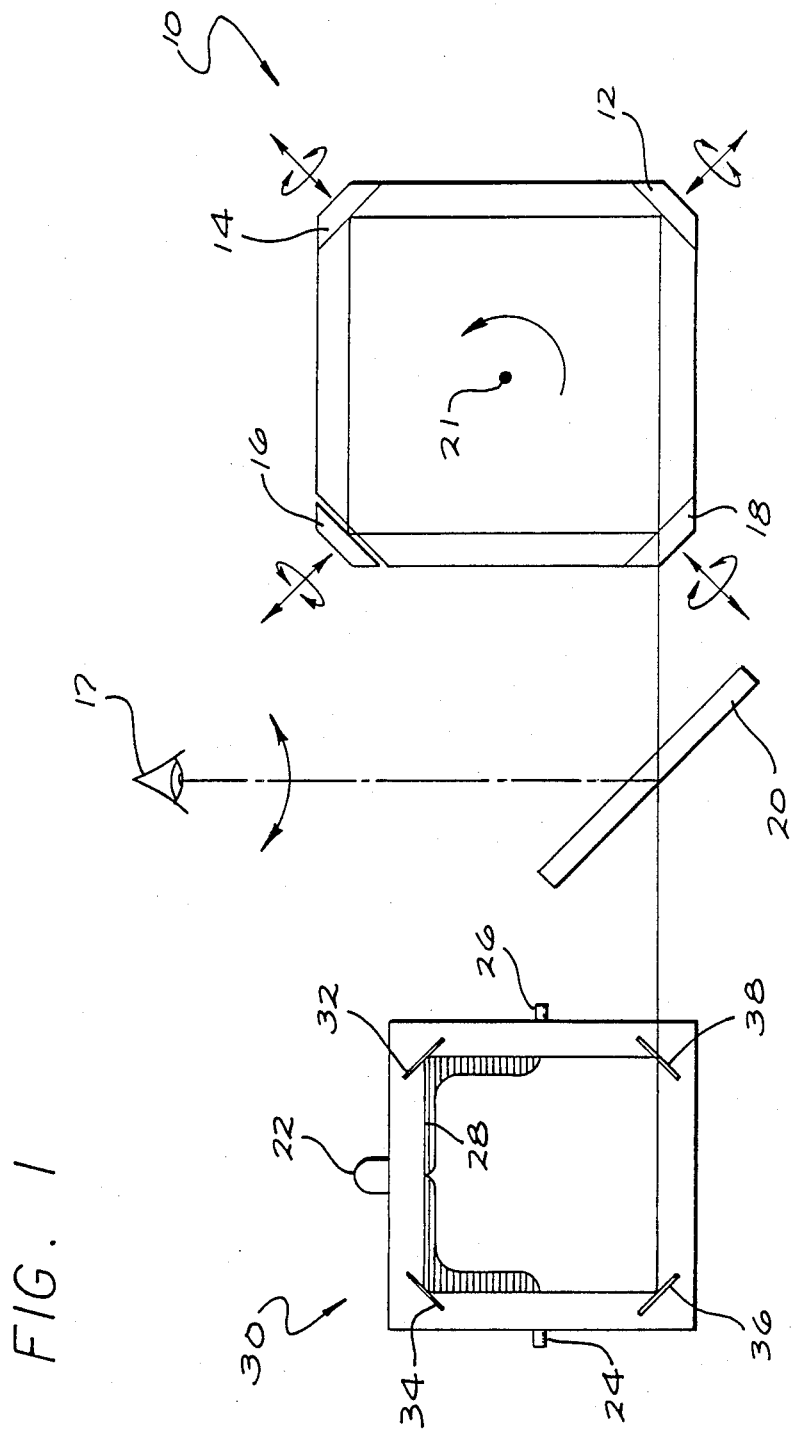
FIG. 1 is a diagramatic operational view of the ring laser gyroscope mirror orientation system of this invention.
Figure 2:
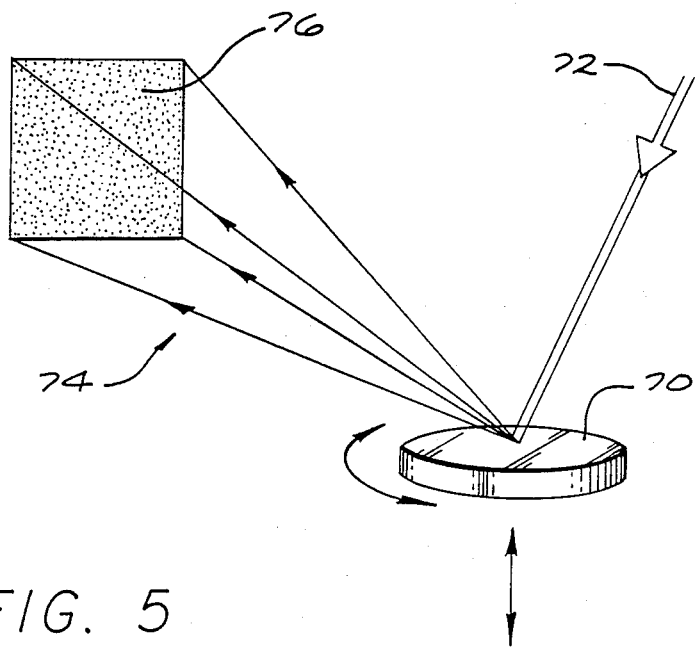
FIG. 2 shows a diagram illustrating a coherent light beam reflected off the surface of one of the mirrors of the ring laser gyroscope, giving rise to a resultant speckle pattern.
Figure 4:
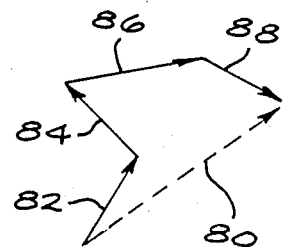
FIG. 4 is a Phasor diagram illustrating the contribution to speckle made by each of four mirrors and their resultant backscatter.

With reference to FIGS. 1, 2, and 4, the method for mirror orientation of this invention is illustrated. FIG. 1 shows a coherent laser source in the form of an active ring laser gyroscope 30. The resonant cavity of the source laser 30 is defined along an optical path determined by mirrors 32, 34, 36, and 38. In this particular embodiment, the active gain medium is disposed between the cathode 22 and each of the anodes 24 and 26. The gain is adjusted to exceed the loss. At mirror 38, an output beam is derived which is presented to the beam splitter 20. The source laser 30 must produce a frequency modulable signal to achieve optimum system conditions.

Resonance of the passive cavity block 10 is obtained by pathlength control of one of the mirrors, such as mirror 36, of the source laser 30. The beam splitter 20 provides a coherent beam to the passive cavity block 10. This cavity is comprised of mirrors 12, 14, 16 and 18, each of which, during gyroscope manufacture, is rotated about its own axis and translated along an axis normal to each mirror's surface. A viewer 17 observes the resultant speckle created throughout the resonant cavity of the passive block 10. Each mirror is rotated and translated one at a time, such as mirror 16. The mirror 16 is translated away from the mounting surface in a manner to retain the mirror's angular orientation, at the beginning of the alignment procedure, to allow free rotary oscillation of the mirror 16 away from the passive cavity block 10. In order to avoid aperture loss, it is important that the normal to the mirror surface be maintained in the same direction when the mirror is lifted from its respective mounting surface such that the cavity optical resonance is maintained. This angular tolerance is approximately ±15 arc sec. After a minimum amplitude mirror angular orientation is found, the mirror 16 is again translated towards the block 10 for securement to the laser cavity. The beam splitter 20 serves to provide a viewer at location 17 with a far field image of the speckle pattern 76 (FIG. 2). The speckle pattern 76 that results when an incident light beam 72 is reflected from a mirror surface 78, as reflected light 74. By rotationally oscillating mirror 16, the viewer 17 is able to determine minimal and maximum points of destructive and constructive interference between coherent waves reflected off the surface of the mirror 17 that are used to form the speckle pattern 76.

Each mirror, such as mirror 16, contributes a particular speckle pattern which may be represented by a phasor such as phasor 82. Together, according to the laws of phasor addition, the entire resonant cavity of the gyroscope 10 has a resultant speckle phasor 80 that is the phasor sum of each of the component phasors 82, 84, 86 and 88. By oscillating mirror 16 alone, only one of the four phasors 82, 84, 86 and 88 is manipulated at a time. A point along the mirror surface 70 of a mirror such as mirror 16, is then located which is at a minimum intensity as indicated by the speckle pattern 76.

It has been known, heretofore, that speckle formation may be created in the image plane of a rough object. By viewing each mirror, such as 16, from a viewer location 17, (FIG. 1) a speckle pattern is observed in the field of view from the viewer location 17 from which minimum points of surface roughness of the mirror surface 70 may be determined. Once such optimal location on the mirrors' surface is obtained, the passive block 10 may be rotated about the axis center 21 in order to position mirror 14, 12, and 18, respectively, so that each of their associated mirror speckle phasors (as illustrated in FIG. 4) may be individually manipulated. Once the optimum mirror speckle phasor in mirror surface location has been determined in relation to each of the mirrors, the resultant phasor 80 will represent the optimum minimal speckle pattern for the entire resonator cavity. A minimal speckle pattern resultant phasor is indicative of minimal backscatter, which gives rise to lock-in, as described herein-before.

The normal cavity phasing methods used to reduce lock-in rate cited in aforesaid patents can still be applied to this system and may give further lock-in reduction. Hence, the method taught by this invention can be used alone, or in conjunction with the other methods taught in these patents to yet a greater advantage.

Figure 3:
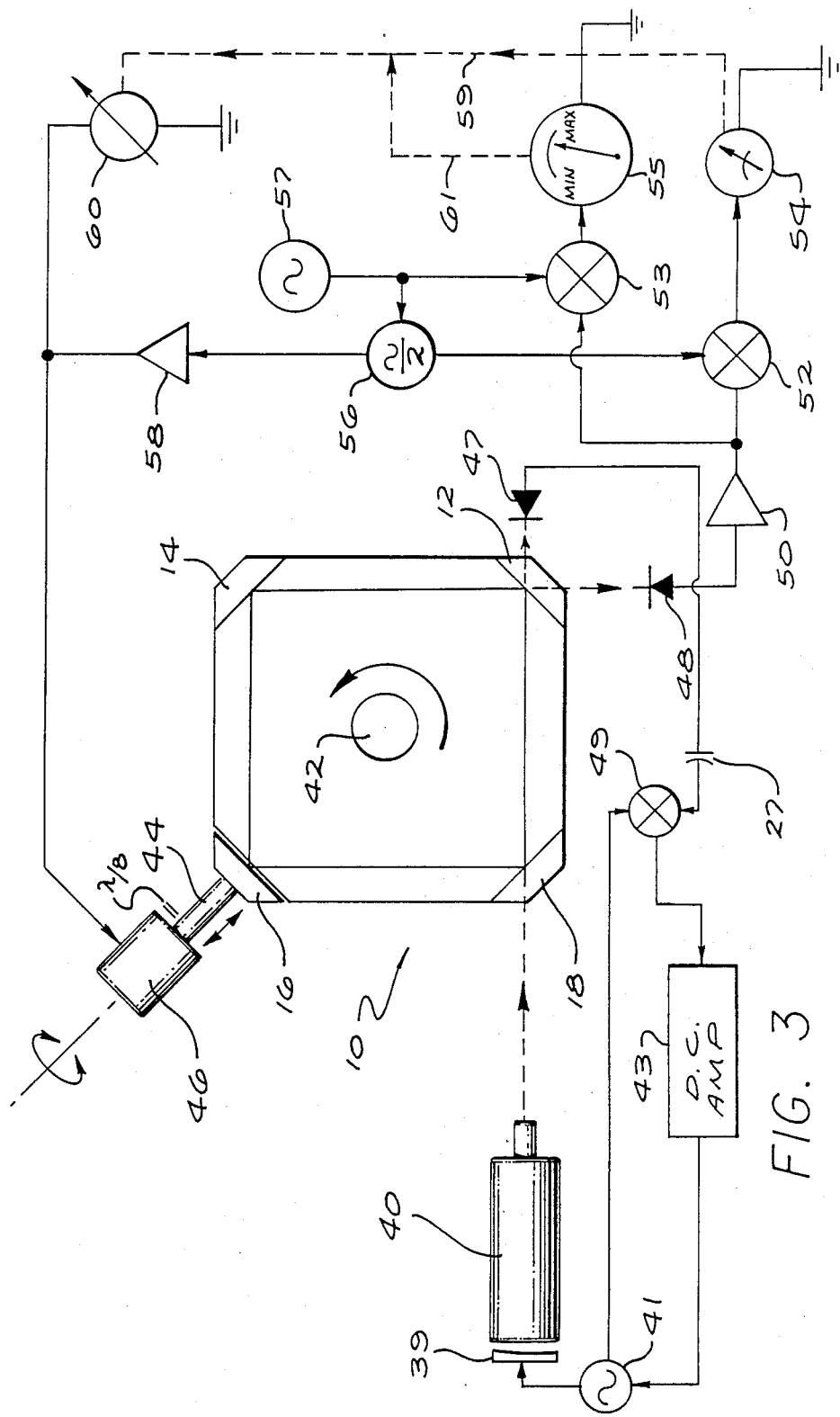
FIG. 3 is a schematic diagram of a mechanization embodiment of the mirror orientation system and method of manufacture of a ring laser gyroscope of this invention.

It is noted that a mechanization of this system may be achieved by use of micromanipulator motors controlled in a synchronous detection mode as illustrated in FIG. 3. FIG. 3 shows a mechanization for the implementation of the method of mirror alignment discussed with regard to FIGS. 1, 2, and 4.

FIG. 3 shows a mirror orientation system wherein a coherent light beam is provided by the laser source 40 to a closed optical pathway within a passive ring laser gyroscope block 10. At each corner of the gyroscope block 10 a mirror 12, 14, 16, and 18 is positioned for optimum orientation. As in FIG. 1, at least two of the mirrors in FIG. 3 are semi-transparent enabling an output detection system to read the speckle pattern output of the passive ring laser gyroscope block 10. An output light beam indicative of the far field speckle pattern exits the passive ring laser gyroscope block 10 through mirror 12 as shown in FIG. 3. By manipulating mirror 16 by the micromanipulator 46, the detector 48 detects a change in speckle pattern due to the rotation of mirror 16 only along an axis normal to its surface. In this manner the particular phasor associated with mirror 16 and its affiliated speckle pattern may be measured and used to provide feedback in a servo-loop for controlling the micromanipulator 46.

In order to detect a signal high enough to be observed, a high gain and low noise signal is needed. Resonance enhancement, due to the cavity finesse, greatly increases the backscattered intensity; and, AC detection is used for a thirty dB or better gain in signal-to-noise ratio via a bandwidth reduction. It is also desirable to have accurate low noise detection and lo noise amplifiers in association with such a detection system. The source laser frequency must be locked to the resonant frequency of the passive gyroscope block. To accomplish this locking, an output optical signal directly from laser source 40 is detected by detector 47. The optical signal is converted to an AC electrical signal by the action of detector 47 and capacitor 27. This AC signal, representative of the optical signal detected at 47, is multiplied by the modulator 49 with a reference signal generated by signal source 41. The modulated output signal from the modulator 49 is amplified by the D.C. amplifier 43 and provided to the signal source 41 to vary a mirror dithering piezo-electric transducer (PZT) 39, adjusting the cavity length (and thus the output frequency) of the laser source 40; in this manner, the laser source output frequency matches the resonant frequency of the passive gyroscope block 10.

Figure 5:
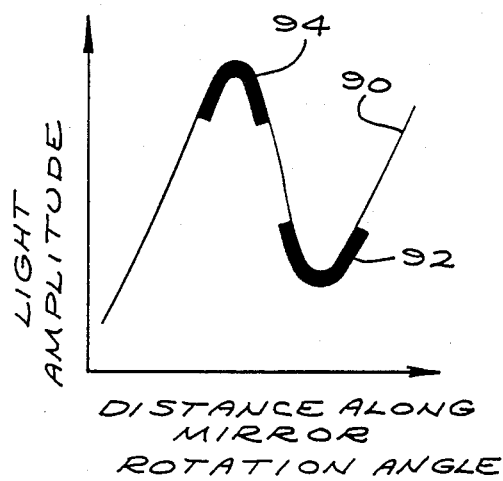
FIG. 5 is a graphic representation of light amplitude plotted against mirror rotation angle showing how the optimum location on this surface is found.

The output signal from the frequency divider 56, is applied to another amplifier 58 and then to the rotator, 46, to cause a modulation of the retroscattered intensity. The output optical signal from the mirror 12 is also detected by the detector 48 and amplified by the amplifier 50, which is a narrowband, low noise amplifier. The output signal from amplifier 50 is provided to the multiplier 53, (e.g. PAR model No. 124) to be multiplied with the output of a free running oscillator 57. The oscillator 57 also provides a signal to the frequency divider 56, which is set in a divide by two mode. The output of multiplier 53 is provided to maximum/minimum meter 55 (corresponding to maximum 94 or minimum 92 of curve 90 of FIG. 5.) The output of the amplifier signal is also provided to the demodulator 52. This output signal from amplifier 50 is multiplied by an output signal from the frequency divider 56. The output of the demodulator 52 may be presented to a read out meter 54 indicating that the speckle pattern amplitude, has reached a maximum or minimum value (such as sections 94 or 92 of curve 90 of FIG. 5).

A DC variable control 60 imparts rotational movement to shaft 44, so that of the mirror 16 may exhibit minimum speckle. Orientation of each of the mirrors is accomplished, either by manual feedback through observer operation observing meters 54 and 55, or an automated pathway such as 59 and 61, which may be computer-controlled.

Mirror 16, before being secured to the laser gyroscope block 10, is translated back along an axis normal to its surface by translational movement of the shaft 44 at least ⅛ of a wavelength of the light beam within the optical pathway of the gyroscope block 10. An oscillatory rotation of the mirror is again conducted to verify that the "null" found originally by oscillatory manipulation of the mirror 16 about its axis was not a coincidence due to phase change, but a true speckle amplitude minimum. Having accomplished this task, several more minima should be examined and the best one should be chosen.

In this manner a method of synchronous detection and a system for accomplishing the same is disclosed allowing the mirror orientation method and system of this invention to be exhibited according to a preferred method and system of micromanipulation illustrated in FIG. 3.

While particular embodiments of the afore mentioned invention are disclosed, it is not within the intent nor spirit of this application to thereby exclude alternative embodiments or their equivalents to the method of mirror speckle controlled orientation or the system for accomplishing such orientation as previously described. Rather, the following claims are to be construed broadly to include equivalent alternate embodiments to the design as illustrated and described in this application.

In addition a laser gyro is disclosed in which at least one mirror has been manipulated so that its specific speckle pattern radiated in the backward direction is reduced. Further and more optionally, a ring laser gyro in which all the mirrors have been so placed is disclosed.

What is claimed is:

1. In a ring laser gyroscope, having a frame, and a closed optical path formed by a plurality of reflecting mirrors;
   a method of orientation for at least one of said mirrors in order to provide a lower scatter and optimum cavity finesse, comprising the steps of:
   (a) rotationally oscillating, at least one of each of a plurality of mirrors positioned away from said ring laser gyroscope frame along an axis of rotation which is parallel to a normal of said mirror;
   (b) measuring a resonant output light beam emitted from said closed optical path to determine a speckle pattern intensity of said beam at a reflection point on a reflecting surface of said rotationally oscillating mirror;
   (c) positioning said rotationally oscillating mirror securely onto a corner of said frame when said speckle pattern from said mirror has reached a minimum optical intensity;
   repeating steps (a) through (c) above for each remaining mirror one at a time until each mirror along said optical path is secured to said frame at a reflecting point such that the overall scatter is optimized;
   whereby, proper orientation of each of the mirrors along said closed optical pathway will be achieved.

2. The method orientation of claim 1 wherein
   each mirror is reciprocally rotated, one at a time, about its own axis by a relatively small amount; and each mirror is translated, along its normal, a small distance away from said ring laser gyroscope frame, while said mirror is reciprocally rotated about its own normal; and each mirror is translated back towards said frame after an optimum reflection point on said mirror is found for secure positioning of said mirror to said frame.

3. The method of orientation of claim 2, wherein: each mirror is reciprocally rotated about its own normal over a range of ±20 arc seconds.

4. The method of orientation of claim 2, wherein: each mirror is translated at least ⅛ of a wavelength along an axis normal to its surface and again reciprocally rotated, to confirm the accuracy of initial orientation procedures.

5. The method of orientation of claim 1, wherein: said resonant output light beam is provided to said closed optical path from a coherent light beam source.

6. A system for orientation for at least one of a plurality of mirrors of a ring laser gyroscope, said gyroscope including a monolithic frame defining a closed optical path formed by an internal cavity which connects said plurality of mirrors, said orientation system comprising:

a source laser providing an external coherent light beam source to said optical pathway, said light beam being reflected from the surfaces of each mirror along the optical path producing a resultant speckle which is a function of combined backscatter of light of the surfaces of said mirrors;

micromanipulator means for fine movements of one of said mirrors affixed to one of said mirrors, said micromanipulator means providing a micro-translation reciprocally along an axis normal to the plane of a mirror surface being measured; and said micromanipulator means providing oscillatory movement of one of said mirrors about its own axis when said mirror is withdrawn off the frame of said gyroscope;

detection means for detecting an output light signal speckle pattern associated with the mirror under fine movement by the micromanipulator means;

synchronous detection and feedback means for adjusting said micromanipulator means to select an optimum location on the surface of said mirror being moved by said micromanipulator means as detected by said detection means;

whereby, each of said mirrors are positioned along said optical path along an optimum mirror surface location properly aligned for maximum ring laser gyroscope performance.

7. The system for orientation of claim 6, wherein: a piezo-electric transducer (PZT) is used to change the cavity length and output frequency of said source laser to phase lock into a resonant frequency of said closed optical pathway of the monolithic frame;

and, a phase lock loop means is used to drive said source laser to a resonant frequency of said closed optical pathway.

8. A system for orientation of at least one of a plurality of mirrors of a mirrored ring resonator, said mirrored ring resonator including a monolithic frame defining a closed optical path formed by an internal cavity which connects said plurality of mirrors, said orientation system comprising:

a source laser providing an external coherent light beam source to said optical pathway, said light beam being reflected from the surfaces of each mirror along the optical path producing a resultant speckle which is a function of the combined backscatter of light of surfaces of said mirrors;

micromanipulator means for fine movements of one of said mirrors affixed to one of said mirrors, said micromanipulator means providing a micro-translation reciprocally along an axis normal to the plane of a mirror surface being measured; and said micromanipulator means providing rotational oscillatory movement of one of said mirrors about its own normal when said mirror is withdrawn off the frame of said mirrored ring resonator;

detection means for detecting an output light signal speckle pattern associated with the mirror under fine movement by the micromanipulator means;

synchronous detection and feedback means for adjusting said micromanipulator means to select an optimum location on a surface of said mirror being moved by said micromanipulator means as detected by said detection means;

whereby, each of said mirrors are positioned along said optical path along an optimum mirror surface location properly orientated for maximum mirrored ring resonator performance.

9. A ring laser gyroscope, including a monolithic frame defining a closed optical path formed by an internal cavity which connects a plurality of mirrors, wherein the improvement comprises:

means for rotationally oscillating at least one mirror of said plurality of mirrors; a resonant cavity measuring means for measuring output light emitted from said closed path; means for determining a speckle pattern at a reflection point on a reflecting surface of said at least one mirror; and, means for positioning said at least one mirror securely into a corner of said monolithic frame when said speckle pattern at said at least one mirror has reached a minimum optical intensity, such that said at least one of said mirrors is oriented to a speckle reduced position;

whereby, said backscatter is reduced to an optimum value for maximum gyroscope performance.

* * * * *